United States Patent
Moore et al.

(10) Patent No.: US 11,359,714 B2
(45) Date of Patent: Jun. 14, 2022

(54) CONTROL SYSTEM FOR OPPORTUNISTIC HEATING OF TRANSMISSION FLUID

(71) Applicant: Ford Global Technologies, LLC, Dearborn, MI (US)

(72) Inventors: Nicholas David Moore, Dearborn, MI (US); Rian Edman, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 169 days.

(21) Appl. No.: 16/809,705

(22) Filed: Mar. 5, 2020

(65) Prior Publication Data
US 2021/0277987 A1 Sep. 9, 2021

(51) Int. Cl.
*F16H 57/04* (2010.01)
*F16H 59/72* (2006.01)

(52) U.S. Cl.
CPC ..... *F16H 57/0413* (2013.01); *F16H 57/0415* (2013.01); *F16H 57/0435* (2013.01); *F16H 59/72* (2013.01)

(58) Field of Classification Search
CPC ............ F16H 57/0413; F16H 57/0415; F16H 57/0435; F16H 57/0417; B60H 1/14
See application file for complete search history.

(56) References Cited

U.S. PATENT DOCUMENTS

| | | | |
|---|---|---|---|
| 8,409,055 B2 | 4/2013 | Gooden et al. | |
| 8,806,882 B2* | 8/2014 | Bennion | F01P 7/165 62/323.1 |
| 10,161,501 B2 | 12/2018 | Gonze et al. | |
| 2015/0159538 A1 | 6/2015 | Jeong | |

FOREIGN PATENT DOCUMENTS

| | | |
|---|---|---|
| WO | 2018053082 A1 | 3/2018 |
| WO | 2019068192 A1 | 4/2019 |

\* cited by examiner

*Primary Examiner* — Tinh Dang
(74) *Attorney, Agent, or Firm* — Burr & Forman, LLP

(57) ABSTRACT

A thermal management for a hybrid vehicle is provided. The system includes an engine coolant to cabin air heat exchanger in a first heat exchange loop and being operably coupled to an engine coolant circuit and cabin air in the vehicle, respectively, a transmission fluid to engine coolant heat exchanger in a second heat exchange loop and being operably coupled to a transmission fluid circuit and the engine coolant circuit, respectively, a control valve operable to control a flow of engine coolant through at least the second heat exchange loop, and a control module configured to selectively operate the control valve to initiate or restrict the flow through the second heat exchange loop to provide heat to the transmission fluid circuit based on ambient temperature, transmission fluid temperature and engine coolant temperature. The control module is further configured to enable control functions associated with transmission operation and hybrid functions based on the transmission fluid temperature.

20 Claims, 6 Drawing Sheets

CONTROL SYSTEM FOR OPPORTUNISTIC HEATING OF TRANSMISSION FLUID

TECHNICAL FIELD

Example embodiments generally relate to hybrid vehicle systems and, more particularly, relate to a way to reduce the time that certain hybrid vehicle systems or functions are either unavailable or operationally limited due to transmission fluid temperature.

BACKGROUND

In automotive applications, a number of fluid systems may be employed in order to cool or heat various vehicle components. In some cases, individual components or component systems may have corresponding individual cooling or heating circuits. As an example, a hybrid vehicle may include a main engine cooling circuit that may provide cooling to the main engine, along with two corresponding cooling circuits associated with providing cooling for the battery and the inverter unit, respectively, and a cabin climate control circuit as well. Each of these circuits or systems may operate independently of one another to provide thermal control for their respective systems using heat exchangers and fluid systems.

Meanwhile, in some cases, the individual components or component systems that are served by these cooling or heating circuits may be inhibited in their operation until certain operational parameters are met. For example, a typical ten speed, rear wheel drive transmission may employ certain gear shift selection limitations when transmission fluid temperature is below 20° C. These limitations may be referred to as a "cold shift schedule" and may limit gear selection and affect overall vehicle efficiency and drivability when employed. For hybrid vehicles or modular hybrid transmission applications, there may be additional operational limitations. For example, a function called "creep cancel," which involves e-machine spin down when the vehicle comes to a stop, is generally inhibited from operation below 17.5° C. The lack of employment of creep cancel may result in an efficiency reduction for the vehicle since the e-machine is consuming extra power compared to operation at normal ambient temperatures. Additionally, regenerative braking (i.e., using the e-machine to recapture braking energy) may also be inhibited below −6.7° C. due to the torque converter hardware limitations (e.g., having an inability to lock below this temperature), Until these and any other functions that are dependent on the operating transmission fluid temperature can be restored, the customer may notice corresponding reductions in fuel efficiency and longer engine run times as compared to normal operating conditions at higher ambient temperatures.

Thus, it may be desirable to develop an alternative strategy for enabling the transmission fluid temperature to be heated more quickly to exceed the values that correspond to certain respective limitations. By doing so, vehicle efficiency may be increased and customer satisfaction may also be improved.

BRIEF SUMMARY OF SOME EXAMPLES

In accordance with an example embodiment, a thermal management for a hybrid vehicle is provided. The system includes an engine coolant to cabin air heat exchanger in a first heat exchange loop and being operably coupled to an engine coolant circuit and cabin air in the vehicle, respectively, a transmission fluid to engine coolant heat exchanger in a second heat exchange loop and being operably coupled to a transmission fluid circuit and the engine coolant circuit, respectively, a control valve operable to control a flow of engine coolant through at least the second heat exchange loop, and a control module configured to selectively operate the control valve to initiate or restrict the flow through the second heat exchange loop to provide heat to the transmission fluid circuit based on ambient temperature, transmission fluid temperature and engine coolant temperature. The control module is further configured to enable control functions associated with transmission operation and hybrid functions based on the transmission fluid temperature.

In another example embodiment, a control module for a thermal management system for a hybrid vehicle is provided. The thermal management system may include an engine coolant to cabin air heat exchanger in a first heat exchange loop and being operably coupled to an engine coolant circuit and cabin air in the vehicle, respectively, a transmission fluid to engine coolant heat exchanger in a second heat exchange loop and being operably coupled to a transmission fluid circuit and the engine coolant circuit, respectively, and a control valve operable to control a flow of engine coolant through at least the second heat exchange loop. The control module may include processing circuitry configured to selectively operate the control valve to initiate or restrict the flow through the second heat exchange loop to provide heat to the transmission fluid circuit based on ambient temperature, transmission fluid temperature and engine coolant temperature. The processing circuitry may be further configured to enable control functions associated with transmission operation and hybrid functions based on the transmission fluid temperature.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
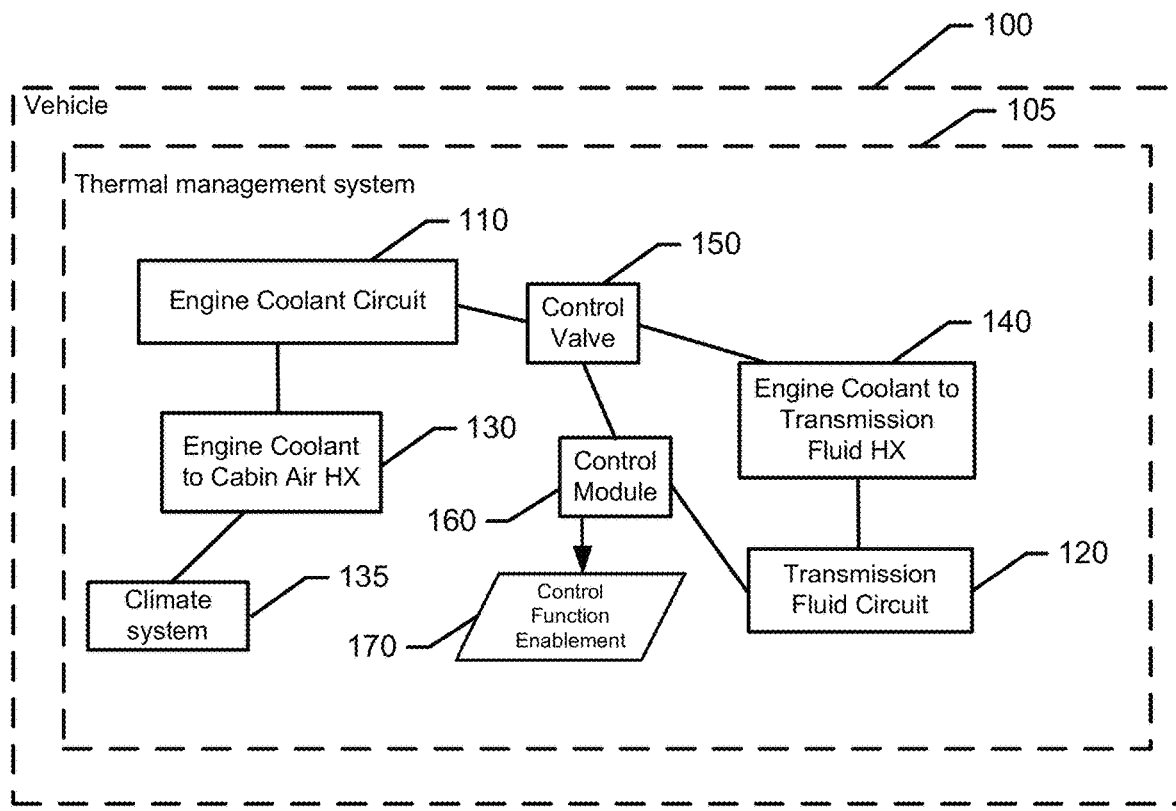
FIG. 1 illustrates a block diagram of a thermal management system of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an improved design for opportunistically heating transmission fluid. In this regard, the engine coolant may be employed to heat transmission fluid and thereby restore or enable certain functions that are otherwise inhibited based on low transmission fluid temperature. Although some cooperative operation between heat exchangers and cooling circuits may already exist (e.g., for improving cabin comfort by heating the cabin during cold operation), example embodiments may employ intelligently guided cooperative operation to further enable the transmission fluid to be heated more quickly than would normally be the case without negatively impacting cabin climate. For example, if engine coolant temperatures reach a selected amount above an engine cabin air heat exchanger target temperature, then flow may be directed through a transmission fluid to engine coolant heat exchanger until the engine coolant temperature decreases to a set value. This logic may be applied at ambient temperatures below a set value and may run until the transmission is determined to be up to operating temperature.

FIG. 1 illustrates a block diagram of cooling circuits of a vehicle 100 (e.g., a hybrid vehicle) of an example embodiment. As shown in FIG. 1, the vehicle 100 may include a thermal management system 105 that may cool and/or heat various components or systems of the vehicle 110. Thus, for example, the thermal management system 105 may include an engine coolant circuit 110 and a transmission fluid circuit 120. However, as noted above, the vehicle 100 (and particularly the thermal management system 105) may include additional cooling circuits as well. The engine coolant circuit 110 may include engine coolant that circulates through the engine coolant circuit 110 to remove heat from the engine (or engine block). The transmission fluid circuit 120 may include transmission fluid (e.g., transmission oil) that is configured to provide transmission gear lubrication and facilitate valve operation along with improved function or lubrication of various other transmission system components.

The thermal management system 105 may further include an engine coolant to cabin air heat exchanger 130 (e.g., heater core) that is configured to facilitate maintaining cabin temperature in accordance with parameters selected by the operator of the vehicle 100, or various default settings associated with a climate system 135 via which cabin air temperature is controlled. Thus, for example, the engine coolant to cabin air heat exchanger 130 may be configured to extract heat from the engine coolant circuit 110 and use the extracted heat to warm air circulated or applied in the cabin of the vehicle 100. The engine coolant to cabin air heat exchanger 130 therefore enables the cabin (or heating thereof) to be a heat sink for the engine (and particularly a heat sink for the engine coolant circuit 110.

The thermal management system 105 may also include an engine coolant to transmission fluid heat exchanger 140. The engine coolant to transmission fluid heat exchanger 140 may be configured to transfer heat from the engine coolant circuit 110 to the transmission fluid circuit 120. In this regard, for example, the engine coolant to transmission fluid heat exchanger 140 may include a heat exchange interface (e.g., a metallic surface or surfaces) that have fluid from the engine coolant circuit 110 on one side thereof and fluid from the transmission fluid circuit 120 on the other side thereof to facilitate heat transfer between the respective circuits.

The thermal management system 105 of an example embodiment may further include a control valve 150 that may be configured to control the amount of flow through the engine coolant to transmission fluid heat exchanger 140. In an example embodiment, the control valve 150 may operate under responsive to control signals provided by a control module 160. The control module 160 may be embodied as a power-train control module (PCM) in some cases. The control module 160 may include processing circuitry (e.g., one or more instances of a microprocessor or controller and corresponding memory for storing instructions, applications, or control related programs for controlling various aspects associated with operation of the engine (e.g., via an engine control unit (ECU)) and/or transmission (e.g., via a transmission control unit (TCU)).

In particular, for example, the control module 160 may be configured to receive information from various sensors and/or components of the thermal management system 105. Based on the information received, the control module 160 may consider cabin climate control commands or cabin climate conditions (e.g., allowing extra heat generated by the engine coolant circuit 110 to first be used as needed for cabin climate control), but when there is either extra heat available or when cabin climate conditions are already such that no or less heat needs to be extracted from the engine coolant circuit 110 for cabin climate control, then the control module 160 may utilize heat from the engine coolant circuit 110 to heat the transmission fluid circuit 120.

As such, the control module 160 and the control valve 150 may cooperate to, without negatively impacting cabin climate priorities, maximize the ability to opportunistically heat the transmission fluid based on ambient temperature. In this regard, for example, the ambient temperature, along with various other system temperatures, will be used to control the opportunistic heating of the transmission fluid. By maximizing heat extraction from the engine coolant circuit 110 intelligently for application to the transmission fluid circuit 120, the control module 160 can monitor transmission fluid temperature to perform control function restoration (or, more generally, enablement) as shown by operation 170 in FIG. 1.

Figure 2:
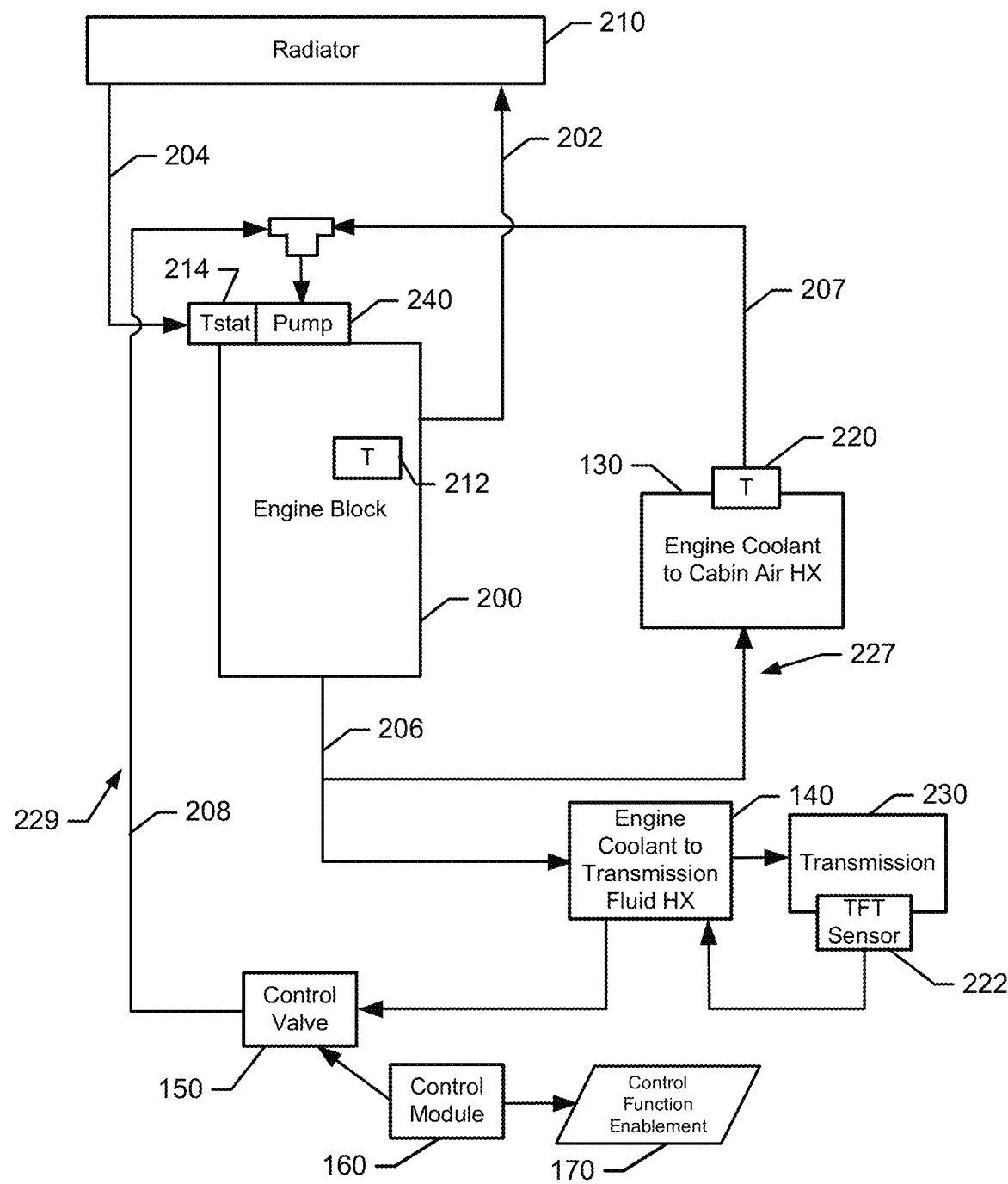
FIG. 2 illustrates a concept view of certain components associated with the thermal management system in accordance with an example embodiment.

FIG. 2 illustrates a more detailed view of various components of the thermal management system 105 in accordance with an example embodiment. In this regard, as shown in FIG. 2, an engine block 200 of the vehicle 100 may send heated engine coolant 202 to a radiator 210. The radiator 210 may be configured to cool the engine coolant to send cooled engine coolant 204 back to the engine block 200. A temperature sensor 212 associated with the engine block 200 may provide an indication of heated engine coolant 202 temperature to the control module 160 of FIG. 1. A thermostat 214 may be configured to close to cutoff flow through the radiator 210 to keep heat in the engine block 200 so that such heat can be sent to the cabin heater core and for opportunistic heating of transmission fluid as described herein.

In addition to the use of the radiator 210 as a heat sink for the engine block 200, the engine coolant to cabin air heat exchanger 130 and the engine coolant to transmission fluid heat exchanger 140 may each also act as a heat sink for the engine block 200. In this regard, as shown in FIG. 2, hot engine coolant 206 leaving the engine block 200 may be provided to the engine coolant to cabin air heat exchanger 130. A coolant return temperature sensor 220 may be positioned to sense a temperature of first loop return flow 207 to the engine block 200. The first loop return flow 207 may be associated with a first heat exchange loop 227 defined to pass through the engine coolant to cabin air heat exchanger 130. Meanwhile, hot engine coolant 206 may also or alternatively pass through the engine coolant to transmission fluid heat exchanger 140, and second loop return flow 208 may also be provided back to the engine block 200 via a second heat exchange loop 229 defined to pass through the engine coolant to transmission fluid heat exchanger 140. The transmission fluid circuit 120 may be defined between the engine coolant to transmission fluid heat exchanger 140 and transmission 230. A transmission fluid temperature sensor 222 may be positioned to detect transmission fluid temperature at the transmission 230.

As shown in FIG. 2, the first and second heat exchange loops 227 and 229 may essentially operate in parallel with each other. In some cases, a water pump 240 may be provided to generally drive flow through the first and second heat exchange loops 227 and 229. However, the control valve 150 may be used to throttle or otherwise influence a balance between flows in the first and second heat exchange loops 227 and 229 based on positioning of the control valve 150 as determined by the control module 160. In an example embodiment, the control module 160 may receive temperature information from any combination or all of the temperature sensors shown in FIG. 2 (e.g., the temperature sensor 212, coolant return temperature sensor 220, transmission fluid temperature sensor 222, and one or both of ambient temperature information and cabin temperature information. The control module 160 may then operate the control valve 150 and/or engage in other control functions to provide the opportunistic transmission fluid heating described herein so that, for example, when the transmission fluid temperature sensor 222 indicates that certain thresholds for enabling respective functions have been met, the respective functions can in fact be enabled by control function enablement 170 functions directed by the control module 160.

Figure 3:
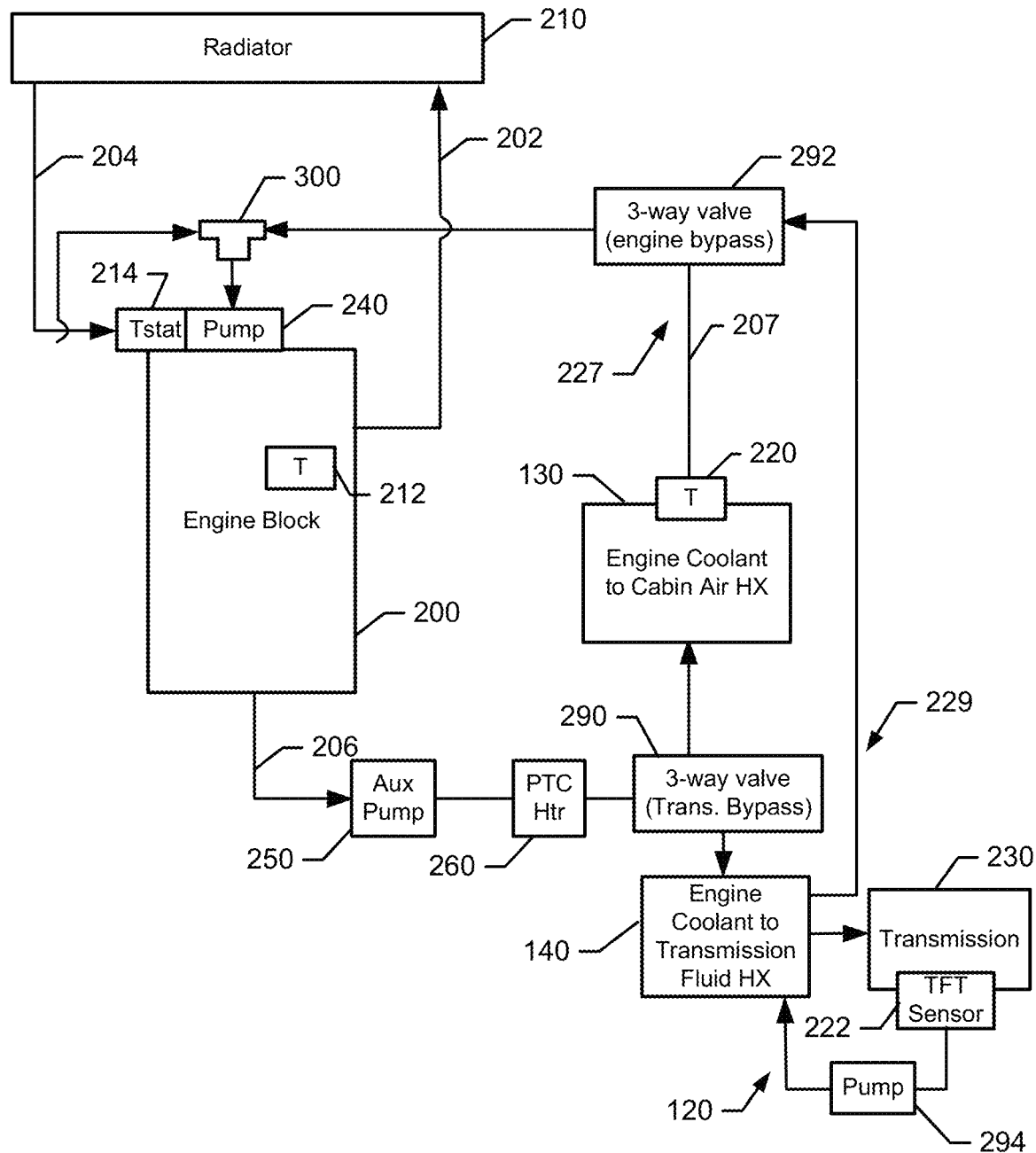
FIG. 3 illustrates a concept view of certain components for employing thermal management while the engine is off and during preconditioning in accordance with an example embodiment.

In some cases, example embodiments may also operate when the engine is off in order to heat transmission fluid via extraction of heat from the cabin via an auxiliary pump. FIGS. 3 and 5 relate to such an example. In this regard, although not required, some embodiments may further include an auxiliary pump 250, which may be configured to enable fluid to be circulated through the first and second heat exchange loops 227 and 229 in series (instead of in parallel) when the vehicle 100 is not running. In this regard, for example, flow could be pushed through the heater core (i.e., the engine coolant to cabin air heat exchanger 130) so that hot air in the cabin could heat fluid pushed through the engine coolant to transmission fluid heat exchanger 140 when ambient temperature and/or cabin temperatures are relatively high. In such an example, the auxiliary pump 250 could be a relatively small auxiliary load powered from the battery unit of the vehicle 100. Alternatively or additionally, the auxiliary pump 250 could work in conjunction with a positive temperature coefficient (PTC) heater 260, which may be used to provide cabin heating to raise the temperature of the cabin. Thus, for example, the PTC heater 260 may be located in the first heat exchange loop 227 and heat from the PTC heater 260 may be passed into the second heat exchange loop 229 via operation of the auxiliary pump 250 and positioning of a first three-way valve 290, and a second three-way valve 292 in order to provide an additional opportunity for opportunistic heating of the transmission fluid.

In embodiments where, for example, the vehicle 100 is a plug-in hybrid electric vehicle (PHEV) or battery electric vehicle (BEV), the auxiliary pump 250 (and/or the PTC heater 260) may be powered from the wall outlet charging the vehicle 100 when plugged in. Thus, for example, the auxiliary pump 250 may not load the battery unit in such examples. This arrangement may work in conjunction with preconditioning of the vehicle 100 (i.e., heating the cabin prior to operation of the vehicle either by operator selection/initiation or due to scheduling preconditioning in advance). In some cases, a departure time for the vehicle 100 may be selected by the operator (or may be known based on an operating schedule defined by the operator). If the departure time is known, the control module 150 may initiate preconditioning for the cabin using the PTC heater 260 in the first heat exchange loop 227. However, the preconditioning process may be modified to also include an additional amount of run time with the auxiliary pump 250 and flow through the second heat exchange loop 229 to use excess heat from the cabin and/or from the PTC heater 260 to heat the transmission fluid. In such a case, the heat extracted from the cabin (or provided by the PTC heater 260) may be transferred to the transmission fluid via the engine coolant to transmission fluid heat exchanger 140. The transmission fluid circuit 120 may include an auxiliary electric transmission fluid pump 294 to provide flow on the transmission fluid side during preconditioning when the main pump is not spinning.

The control module 150 may have programming therein to determine how long (in addition to normal cabin heat up time) the auxiliary pump 250 should be run to achieve maximum heat up of the transmission fluid before departure (and switching from the non-operational state or condition to the operational state or condition). Thus, in some cases, where a departure time is known, the control module 150 may backup from the departure time by a sum of the amount of preconditioning time needed (for a given ambient temperature) to precondition the cabin (i.e., raise cabin temperature to a desired level) and the amount of preconditioning time needed (again for a given ambient temperature) to heat the transmission fluid via heat extraction using the auxiliary pump 250. The sum of those two preconditioning times may tell the control module 150 when to begin the preconditioning process relative to departure (i.e., how long before the departure time to start the warming process).

Accordingly, example embodiments are not only configured to monitor conditions in order to manage flow through the thermal management system 105 to opportunistically heat the transmission fluid as described above during operation of the engine of the vehicle (i.e., during an operational state or condition of the vehicle 100), but also to opportunistically heat the transmission fluid during preconditioning of the vehicle 100 (or when the vehicle is in a non-operational state).

Figure 4:
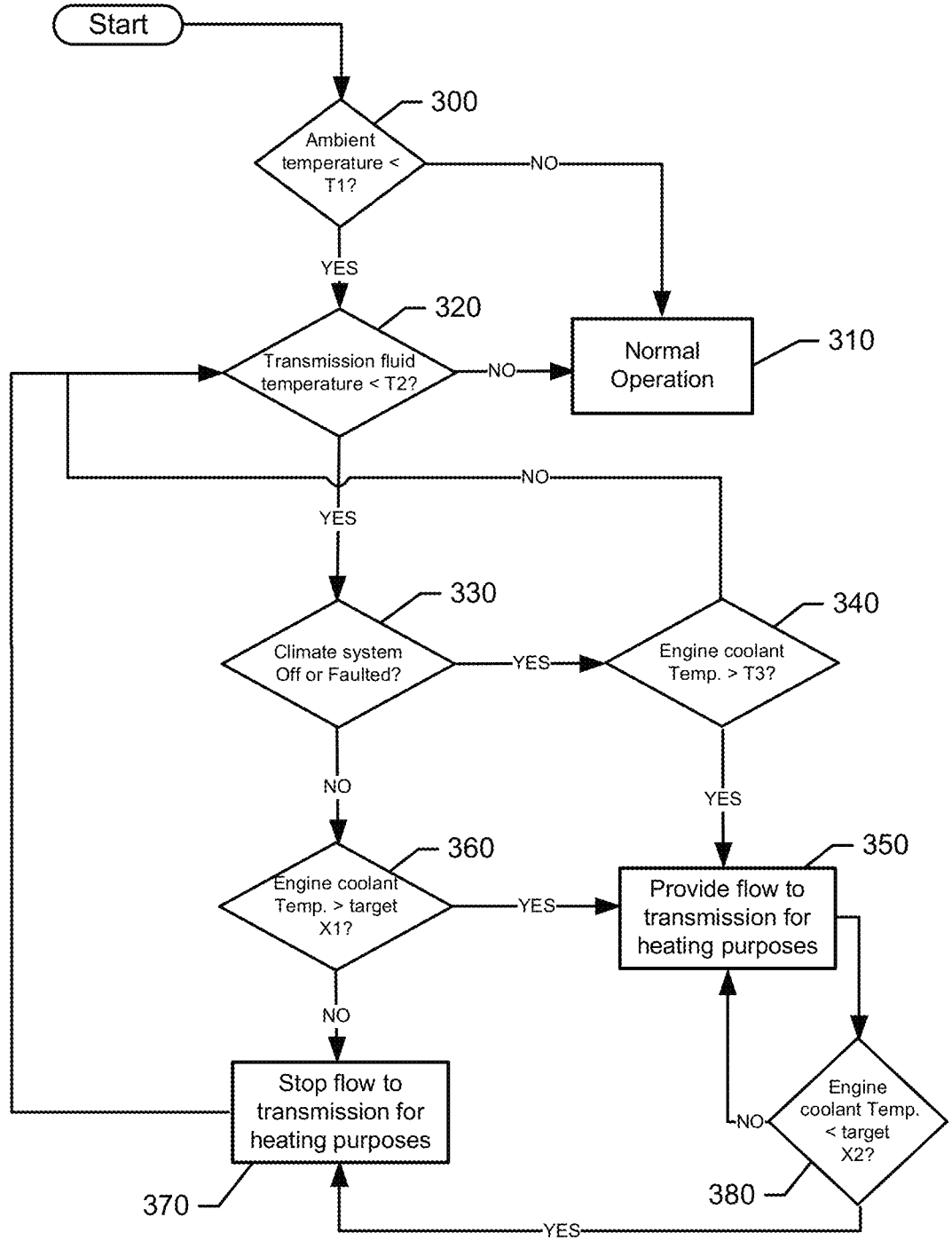
FIG. 4 illustrates a block diagram of a method of operating a control module in the system of FIG. 2 in accordance with an example embodiment.

FIG. 4 illustrates one example of a block diagram for controlling the thermal management system 105 in accordance with an example embodiment of FIG. 2. The method of FIG. 4 may be performed by the control module 160 of FIGS. 1 and 2 in response to starting the vehicle 100. As shown in FIG. 4, an initial reading of ambient temperature may be received and a determination may be made as to whether the ambient temperature is above a threshold ambient temperature (T1) at operation 300. In some cases, the threshold ambient temperature (T1) may be set to about −6.67° C. If ambient temperature is above T1, then it is likely warm enough that normal operation 310 can be conducted without operational restrictions on various transmission or other hybrid-related functions associated with transmission fluid temperature. However, if ambient temperature is below T1, then it is likely cold enough outside that certain operational restrictions will be applied and certain hybrid-related functions may be applied (which is desirable to keep to a minimum).

If ambient temperature is below T1, then a determination is made regarding the status of transmission fluid temperature at operation 320. In this regard, for example, if the vehicle 100 had recently been running the transmission fluid temperature may still be high depending on how long ago the vehicle was shutdown. If so, and transmission fluid temperature remains above a threshold transmission fluid temperature (T2), then normal operation may be conducted at operation 310. However, if transmission fluid temperature is below T2, then a determination may be made at operation 330 as to whether the climate system is turned off (or faulted). If the climate system is not on (or is faulted), then a determination may be made regarding engine coolant temperature at operation 340. If engine coolant temperature is below an engine coolant temperature threshold (T3) at operation 340, then flow may return to operation 320. Thus, the sequence from operation 340, to 320, to 330 and back to operation 340 can effectively repeat over and over again during operation while the engine coolant heats up (while the climate system is off or faulted) until the engine coolant temperature reaches and exceeds T3. In this regard, if engine coolant temperature is greater than T3 at operation 340, then the control valve 150 may be operated in order to provide flow to the transmission 230 for heating of the transmission fluid via the hot engine coolant at operation 350. T2 may have a value that varies depending on the specific vehicle or transmission. In some cases, T2 may range between about 20° C. to about 40° C. T3 may also vary, and may have a value in a range between about 45° C. and about 80° C. The lower boundary for T3 may be determined based on when the engine controls consider the engine "warm" and the upper boundary may be determined based on when the thermostat 214 would start to open to avoid losing heat to the radiator.

Returning again to operation 330, if the climate system is instead operational and on (i.e., not off or faulted), then a determination may be made as to how engine coolant temperature compares to a target value (X1) at operation 360. The target value (X1) may, for example, be based on a target heater core temperature or cabin climate temperature (i.e., indicating that engine coolant temperature is sufficient to drive cabin temperature above its desired setpoint and therefore some excess heat can be removed). X1 may range from about 65° C. to about 80° C. If the engine coolant temperature is above X1 (i.e., the target value), then flow may proceed to operation 350 and the control valve 150 may be operated in order to provide flow to the transmission 230 for heating of the transmission fluid via the hot engine coolant. This flow runs through the second heat exchange loop 229 in parallel with the flow through the first heat exchange loop 227, which has been confirmed to be meeting targets for providing cabin climate control.

However, if the engine coolant temperature is below the target value (X1), then flow to the transmission 230 may be stopped for heating purposes (e.g., by closing the control valve 150) at operation 370. The process may then cycle back to operation 320. Meanwhile, if the engine coolant temperature is above the target value (X1), and flow proceeded to operation 350, then a new determination is made periodically after flow is initiated at operation 380. The determination made at operation 380 is regarding whether engine coolant temperature has decreased below a target value (X2). X2 may have a range from about 55° C. to about 70° C., or at least about 5 to 10 degrees colder than X1 to provide hysteresis for the system. If the engine coolant temperature stays above the target value (X2), then flow to the transmission for heating purposes (at operation 350) may continue until the next periodic check. However, if the engine coolant temperature reduces to be below the target value (X2), then flow may be stopped at operation 370. Of note, the target value (X2) may be lower than the target value (X1). Thus, for example, flow through the transmission 230 could effectively be cycled on and off due to operation in accordance with the diagram of FIG. 4 based on cycling between reaching the target value (X1) for engine coolant temperature and reducing below the target value (X2).

Figure 5A:
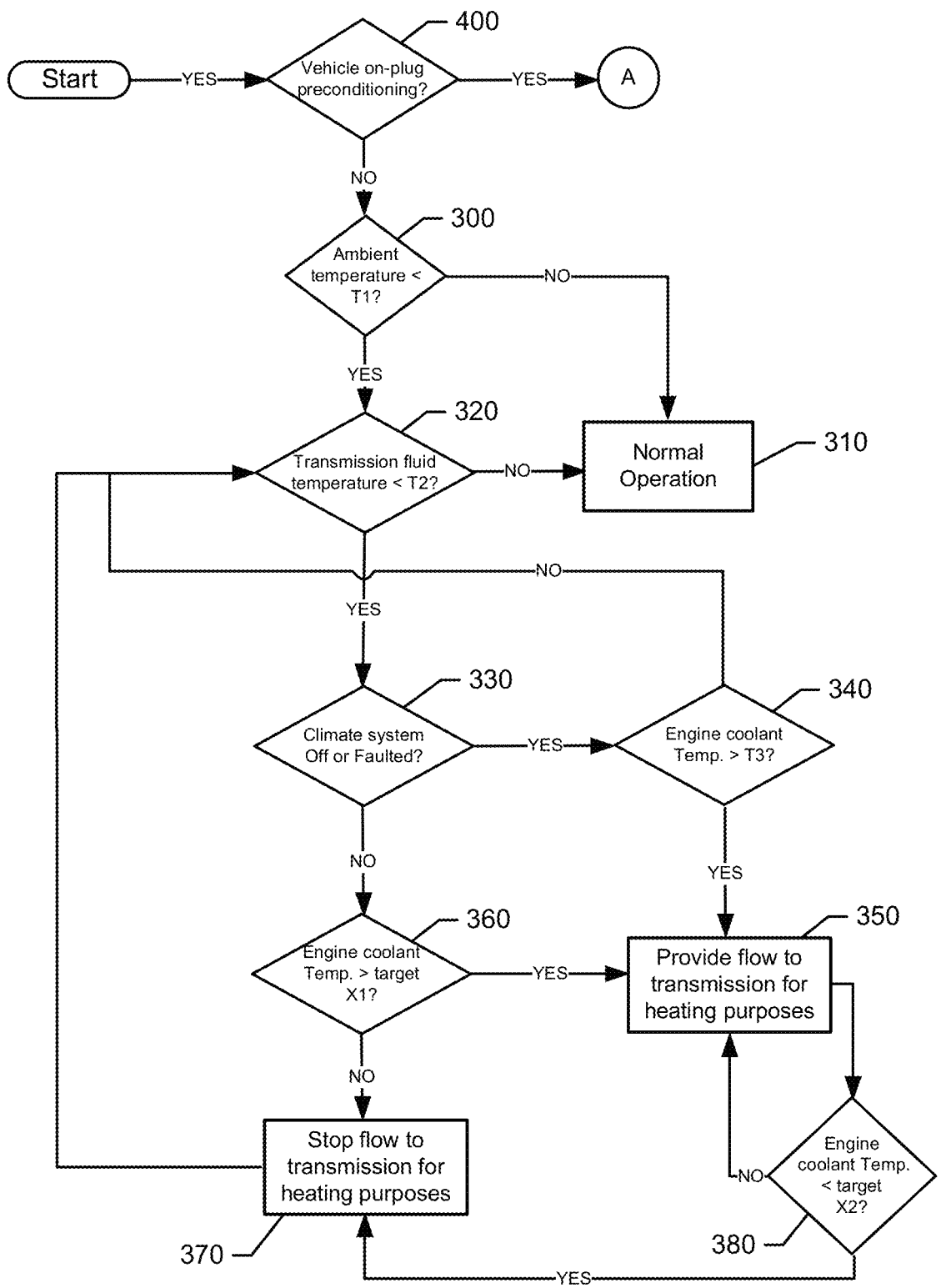
FIG. 5, which is defined by FIGS. 5A and 5B, illustrates a block diagram of a method of operating a control module in the system of FIG. 3 in accordance with an example embodiment.
Figure 5B:
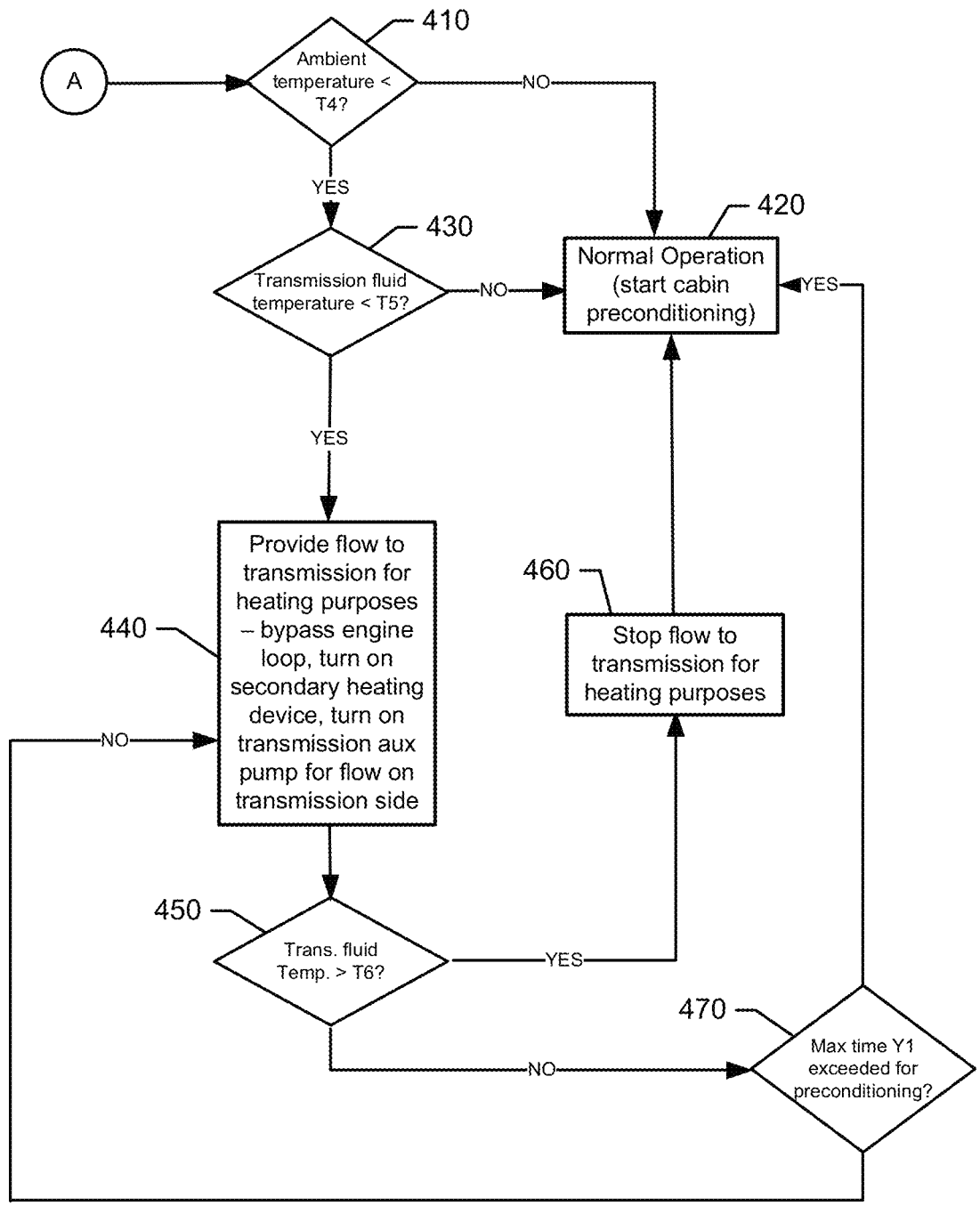

FIG. 5, which is defined by FIGS. 5A and 5B, illustrates one example of a block diagram for controlling the thermal management system 105 where preconditioning is employed in accordance with an example embodiment of FIG. 3. The method of FIG. 5 may be performed by the control module 160. As shown in FIG. 5A, an initial determination may be made as to whether the vehicle is on-plug with preconditioning requested at operation 400. If not, then flow proceeds to operation 300 and the remainder of FIG. 5A is similar to FIG. 4 above. However, if preconditioning is requested while on-plug, then flow proceeds to transition point A on FIG. 5A.

Turning then to FIG. 5B, and starting at transition point A, a determination is made as to whether ambient temperature is below an ambient temperature threshold T4. T4 may be the same as T1 or different in alternate embodiments. If ambient temperature is not below T4, then normal operation or preconditioning may be conducted at operation 420. However, if ambient temperature is below T4, then another determination may be made at operation 430 as to whether transmission fluid temperature is below a value (T5). If transmission fluid is not below T5, then flow returns to operation 420. If the transmission fluid temperature is below T5, then flow can be provided to the transmission for heating purposes at operation 440. The engine loop may be bypassed and a secondary heating device (e.g., the PTC heater 260) may be turned on along with the auxiliary pump 294 to drive flow. This flow may continue and transmission fluid temperature may be monitored at operation 450 to determine if temperature rises higher than T6. If transmission fluid temperature exceeds T6, then flow of transmission fluid for heating purposes may be stopped at operation 460 before returning to operation 420. If transmission fluid temperature is below T6, then a timer may be checked to determine whether a maximum time (Y1) for preconditioning has been exceeded at operation 470. If Y1 has been exceeded, then a return to operation 420 may be conducted. However, if Y1 has not been exceeded, then process flow may return to operation 440.

A thermal management system for a hybrid vehicle may therefore be provided. The thermal management may include an engine coolant to cabin air heat exchanger in a first heat exchange loop and being operably coupled to an engine coolant circuit and cabin air in the vehicle, respectively, a transmission fluid to engine coolant heat exchanger in a second heat exchange loop and being operably coupled to a transmission fluid circuit and the engine coolant circuit, respectively, a control valve operable to control a flow of engine coolant through at least the second heat exchange loop, and a control module configured to selectively operate the control valve to initiate or restrict the flow through the second heat exchange loop to provide heat to the transmission fluid circuit based on ambient temperature, transmission fluid temperature and engine coolant temperature. The control module is further configured to enable control functions associated with transmission operation and hybrid functions based on the transmission fluid temperature.

The thermal management system (or the processing circuitry defining the control module) of some embodiments may include additional features, modifications, augmentations and/or the like to achieve further objectives or enhance operation. The additional features, modifications, augmentations and/or the like may be added in any combination with each other. Below is a list of various additional features, modifications, and augmentations that can each be added individually or in any combination with each other. For example, during operation of the vehicle, responsive to cabin air temperature being below a first threshold when engine coolant temperature is below a second threshold, the control module may be configured to determine whether to provide parallel flows through the first and second heat exchange loops, or provide flow through only the first heat exchange loop based on a status of a climate system configured to control heating of the cabin air and the engine coolant temperature. In an example embodiment, when the climate system is off or faulted, the control valve may be operated to provide the flow through the second heat exchange loop when the engine coolant temperature is greater than an engine coolant threshold temperature. In some cases, the control valve may be operated to stop flow through the second heat exchange loop when the engine coolant temperature falls below a target value. In an example embodiment, the control module may periodically check the engine coolant temperature and may maintain flow through the second heat exchange loop until the engine coolant temperature falls below a target value. In some cases, when the climate system is on, the control valve may be operated to provide the flow through the second heat exchange loop when the engine coolant temperature is greater than a target value associated with indicating excess heat being generated by the climate system. In an example embodiment, the control module may be configured to stop flow through the second heat exchange loop when the engine coolant temperature is less than the target value associated with indicating excess heat being generated by the climate system. In some cases, the control module may be configured to operate the control valve to stop flow through the second heat exchange loop when the engine coolant temperature falls below a second target value, and periodically check the engine coolant temperature and maintain flow through the second heat exchange loop until the engine coolant temperature falls below the second target value. In an example embodiment, when the vehicle is not operational, the control module may be configured to initiate flow through the first and second heat exchange loops in series via operation of the control valve and an auxiliary pump. In some cases, the control module may be configured to determine a start time for initiating the flow through the first and second heat exchange loops based on a projected departure time for the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A thermal management system for a hybrid vehicle, the system comprising:
   an engine coolant to cabin air heat exchanger in a first heat exchange loop, the engine coolant to cabin air heat exchanger being operably coupled to an engine coolant circuit and cabin air in the vehicle, respectively;
   a transmission fluid to engine coolant heat exchanger in a second heat exchange loop, the transmission fluid to engine coolant heat exchanger being operably coupled to a transmission fluid circuit and the engine coolant circuit, respectively;
   a control valve operable to control a flow of engine coolant through at least the second heat exchange loop; and
   a control module configured to selectively operate the control valve to initiate or restrict the flow through the second heat exchange loop to provide heat to the transmission fluid circuit based on ambient temperature, transmission fluid temperature and engine coolant temperature,
   wherein the control module is further configured to enable control functions associated with transmission operation or hybrid vehicle-related functions based on the transmission fluid temperature exceeding a threshold transmission fluid temperature.

2. The thermal management system of claim 1, wherein, during operation of the vehicle, responsive to cabin air temperature being below a first threshold when engine coolant temperature is below a second threshold, the control module is configured to determine whether to provide parallel flows through the first and second heat exchange loops, or provide flow through only the first heat exchange loop based on a status of a climate system configured to control heating of the cabin air and the engine coolant temperature.

3. The thermal management system of claim 2, wherein, when the climate system is off or faulted, the control valve is operated to provide the flow through the second heat exchange loop when the engine coolant temperature is greater than an engine coolant threshold temperature.

4. The thermal management system of claim 3, wherein the control valve is operated to stop flow through the second heat exchange loop when the engine coolant temperature falls below a target value.

5. The thermal management system of claim 3, wherein the control module periodically checks the engine coolant temperature and maintains flow through the second heat exchange loop until the engine coolant temperature falls below a target value.

6. The thermal management system of claim 2, wherein, when the climate system is on, the control valve is operated to provide the flow through the second heat exchange loop when the engine coolant temperature is greater than a target value associated with indicating excess heat being generated by the climate system.

7. The thermal management system of claim 6, wherein the control module is configured to stop flow through the second heat exchange loop when the engine coolant temperature is less than the target value associated with indicating excess heat being generated by the climate system.

8. The thermal management system of claim 6, wherein the control module is configured to operate the control valve to stop flow through the second heat exchange loop when the engine coolant temperature falls below a second target value, and
wherein the control module periodically checks the engine coolant temperature and maintains flow through the second heat exchange loop until the engine coolant temperature falls below the second target value.

9. The thermal management system of claim 1, wherein, when the vehicle is not operational, the control module is configured to initiate flow through the first and second heat exchange loops in series via operation of the control valve and an auxiliary pump.

10. The thermal management system of claim 9, wherein the control module is configured to determine a start time for initiating the flow through the first and second heat exchange loops based on a projected departure time for the vehicle.

11. A control module for a thermal management system for a hybrid vehicle, the thermal management system comprising an engine coolant to cabin air heat exchanger in a first heat exchange loop and being operably coupled to an engine coolant circuit and cabin air in the vehicle, respectively, a transmission fluid to engine coolant heat exchanger in a second heat exchange loop and being operably coupled to a transmission fluid circuit and the engine coolant circuit, respectively, and a control valve operable to control a flow of engine coolant through at least the second heat exchange loop,
wherein the control module comprises processing circuitry configured to selectively operates the control valve to initiate or restrict the flow through the second heat exchange loop to provide heat to the transmission fluid circuit based on ambient temperature, transmission fluid temperature and engine coolant temperature,
wherein the processing circuitry is further configured to enable control functions associated with transmission operation or hybrid vehicle-related functions based on the transmission fluid temperature exceeding a threshold transmission fluid temperature.

12. The control module of claim 11, wherein, during operation of the vehicle, responsive to cabin air temperature being below a first threshold when engine coolant temperature is below a second threshold, the processing circuitry is configured to determine whether to provide parallel flows through the first and second heat exchange loops, or provide flow through only the first heat exchange loop based on a status of a climate system configured to control heating of the cabin air and the engine coolant temperature.

13. The control module of claim 12, wherein, when the climate system is off or faulted, the processing circuitry is configured to operate the control valve to provide the flow through the second heat exchange loop when the engine coolant temperature is greater than an engine coolant threshold temperature.

14. The control module of claim 13, wherein the processing circuitry is configured to operate the control valve to stop flow through the second heat exchange loop when the engine coolant temperature falls below a target value.

15. The control module of claim 13, wherein the processing circuitry periodically checks the engine coolant temperature and maintains flow through the second heat exchange loop until the engine coolant temperature falls below a target value.

16. The control module of claim 12, wherein, when the climate system is on, the processing circuitry is configured to operate the control valve to provide the flow through the second heat exchange loop when the engine coolant temperature is greater than a target value associated with indicating excess heat being generated by the climate system.

17. The control module of claim 16, wherein the processing circuitry is configured to stop flow through the second heat exchange loop when the engine coolant temperature is less than the target value associated with indicating excess heat being generated by the climate system.

18. The control module of claim 16, wherein the processing circuitry is configured to operate the control valve to stop flow through the second heat exchange loop when the engine coolant temperature falls below a second target value, and
wherein the processing circuitry periodically checks the engine coolant temperature and maintains flow through the second heat exchange loop until the engine coolant temperature falls below the second target value.

19. The control module of claim 11, wherein, when the vehicle is not operational, the processing circuitry is configured to initiate flow through the first and second heat exchange loops in series via operation of the control valve and an auxiliary pump.

20. The control module of claim 19, wherein the processing circuitry is configured to determine a start time for initiating the flow through the first and second heat exchange loops based on a projected departure time for the vehicle.

* * * * *